United States Patent [19]

Mangione-Smith

[11] Patent Number: 5,793,991
[45] Date of Patent: Aug. 11, 1998

[54] METHOD OF EQUALIZING LOADS ON A COMPUTER BUS

[75] Inventor: William H. Mangione-Smith, Los Angeles, Calif.

[73] Assignee: Motorola Inc., Schaumburg, Ill.

[21] Appl. No.: 474,811

[22] Filed: Jun. 7, 1995

[51] Int. Cl.⁶ .................................................. G06F 13/00
[52] U.S. Cl. .................................. 395/287; 395/307
[58] Field of Search ........................ 395/307, 500, 395/250, 287

[56] References Cited

U.S. PATENT DOCUMENTS

| | | | |
|---|---|---|---|
| 4,219,874 | 8/1980 | Gusev et al. | 395/775 |
| 4,369,511 | 1/1983 | Kimura et al. | 371/21 |
| 4,447,878 | 5/1984 | Kinnie et al. | 395/307 |
| 4,455,606 | 6/1984 | Cushing et al. | 395/307 |
| 4,514,808 | 4/1985 | Murayama et al. | 395/307 |
| 4,716,527 | 12/1987 | Graciotti | 395/500 |
| 5,055,661 | 10/1991 | Gochi | 235/492 |
| 5,394,528 | 2/1995 | Kobayashi et al. | 395/307 |
| 5,446,845 | 8/1995 | Arroyo et al. | 395/250 |

*Primary Examiner*—Jack B. Harvey
*Assistant Examiner*—Xuong M. Chung-Trans

[57] ABSTRACT

A method for translating information of balancing loads among bus segments to provide a load balanced bus system. The method includes the steps of displacing bus connection balancing loads from a least significant bit location of a digital device bus by an offset factor and translating information between the balancing load and a the digital device bus within a switch by circularly shifting the information by a number of bits equivalent to the offset factor.

3 Claims, 3 Drawing Sheets

METHOD OF EQUALIZING LOADS ON A COMPUTER BUS

FIELD OF THE INVENTION

The field of the invention relates to computer and, in particular to loading of computer memory buses.

BACKGROUND

Microprocessors and the architectures of microprocessors have become well known and are widely used. Microprocessors are typically constructed of a central processing unit, memory, and input/output (I/O) drivers all interconnected with a common bus. The common bus may be used for everything from the initial program load (IPL) from a read only memory (ROM) external to the control processor, to the exchange of data with a random access memory (RAM), or to the exchange of data with external devices (i.e., printers, other computers, etc.).

Control of memory and I/O devices is accomplished through separate data and address buses of the common bus. For example, the microprocessor may issue a read instruction along with an address of a memory location on the address bus and the memory device responds with the contents of the addressed memory location on the data bus. Likewise the microprocessor could issues a write instruction along with an address and a data packet on the data bus. The memory device responds by storing the data in the memory location specified on the address bus. In a similar manner the microprocessor may engage in I/O operations by specifying an address of an I/O register on the address bus and either transmitting or receiving data on the data bus.

While a memory device may communicate exclusively with the microprocessor, the microprocessor often communicates with a multitude of peripheral devices. Because of a need to communicate with more devices, a microprocessor (by necessity) usually has a much larger address bus (e.g., 32 bits) than a RAM address bus (e.g., 16 bits). Because of the differences in bus sizes, microprocessors are often provided with chip select outputs which may be used to enable a memory device for memory access and disable the memory device otherwise.

An example of such a device is the Motorola 68349 microprocessor manufactured by Motorola, Inc. of Schaumburg, Ill. The 68349 has four external chip select connections for control of external memory devices or peripherals. Chip select logic within the 68349 insures that only one of the four chip select signals will be asserted during any given bus transaction.

The chip select logic operates based upon the assumption that each 16 bit peripheral device exists as a continuing block of address locations located somewhere within a 32 bit address of all 0's and all 1's, the locations of the block is identified to the microprocessor during the IPL by values stored within 2 registers associated with each of the 4 chip select outputs (bare address register and mask address register) of the chip select logic. The chip select logic determines whether an address is within an address block of each peripheral by sequentially masking each address asserted by the microprocessor by each of four mask values and comparing the result with an associated base address. If a base address matches, a particular chip select output of the four chip select outputs is asserted.

As mentioned, the 68349 has 4 chip select outputs which allow for the use of 4 peripheral devices. The 4 chip select outputs allow the 4 peripheral devices (such as 4–16 bit RAMs) to be accessed by less than all of the 32 bit address bus. Other devices such as read only memory (ROM) typically require a larger addressing capability and usually specify an address occupying the entire 32 bit bus.

Peripheral devices are typically interconnected using the lowest order bus connections (e.g., a 16 bit RAM having 16 bit data and address lines use computer bus lines 15–0 of both data and address buses). ROMs, on the other hand, occupy the full extent of the processor bus lines. The interconnection of more devices to the lower order bus lines than to the higher order bus lines results in greater capacitance on the lower order bus lines than on the higher order bus lines. The greater capacitance results in lower speed and/or a requirement of more powerful bus drivers to drive the reactive loads presented by the mismatched capacitance loads. Because of the importance of computers a need exists for a method of balancing impedance loads on individual bus lines of computer buses.

SUMMARY

A method is offered of translating information of balancing loads among bus segments to provide a load balanced computer bus system. The method includes the steps of displacing balancing load, bus connections from a least significant bit location of a computer bus by an offset factor and translating information between the balancing load and a processor of the computer bus within a switch by circularly shifting the information by a number of bits equivalent to the offset factor.

DETAILED DESCRIPTION OF THE INVENTION

The solution to the problem of equalizing bus loads in a digital device such as a computer lies, conceptually, in placing load elements where needed on the computer bus, and using a shifting circuit and memory element as an interface between the processor and peripherals for routing data elements between physical planes on opposing sides of the bus structures of processor and peripherals. The circulating shift register replaces the bit clearing shift register used in the prior art. The memory element provides an indicia of bit element location on each side of the processor/ peripheral interface, that can be used to shift data elements to a proper location for transmission across the interface.

Figure 1:
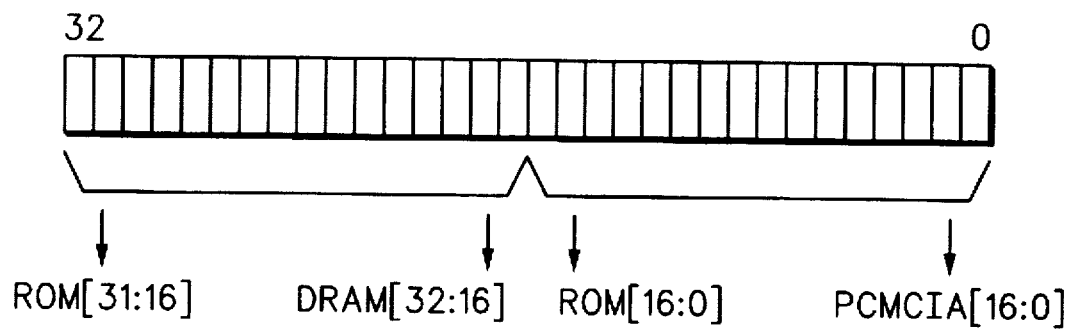
FIG. 1 depicts load distribution of a specific embodiment of a 32 bit computer bus in accordance with the invention.
Figure 2:
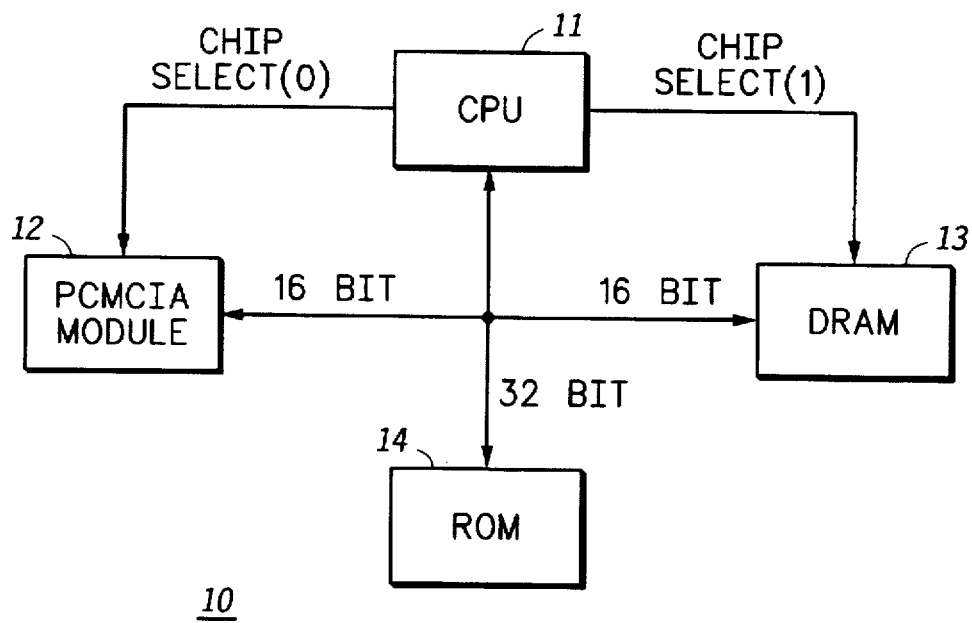
FIG. 2 is a block diagram of a specific example of information flow among load elements of a load balanced computer bus system in accordance with the invention.

FIGS. 1 and 2 depict a specific embodiment of a 32 bit balanced load computer bus system in accordance with the invention. As shown a ROM 14 is interconnected with bus terminals 31–0. A 16 bit Personal Computer Memory Card International Association (PCMCIA) 12 module is shown interconnected with computer bus system terminals 15–0. A 16-bit dynamic random access memory (DRAM) 13, functioning as a balancing load, is shown interconnected with computer bus terminals 31-16. The central processing unit 11 controlling the bus of FIGS. 1 and 2 may be any 32 bit device modified in accordance with the invention.

Under the prior art each chip select pin is controlled by two registers located within a microprocessor such as the 68349. the two registers are the base address register and the mask address register. Both are 32 bits long.

The following table shows the labeling of bits in the 32 bit wide base address register of the 68349 processor. Bit numbers are in bold and are placed above the corresponding bit label. Following the table is a description of the function of each bit using the bit labels as references.

care" bit). By masking the address bits independently, external devices of different size address ranges can be used. Address bits can be set or cleared in any order in the field, allowing a resource to reside in more than one area of the address map. The field can be read or written at any time.

FMC–FMC0—Base Function Code Bits 3–0

This base function code field can be used to mask certain function code bits, allowing more than one address space type to be assigned to a chip select output. Any set bit masks the corresponding function code bit.

DD1–DD0—Delay Bits 1–0

This field, along with the EDS bit of the corresponding base address register, determines the number of wait states added before an internal DSACKx is returned for that entry.

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| BA31 | BA30 | BA29 | BA28 | BA27 | BA26 | BA25 | BA24 | BA23 | BA22 | BA21 | BA20 | BA19 | BA18 | BA17 | BA16 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| BA15 | BA14 | BA13 | BA12 | BA11 | BA10 | BA9 | BA8 | BFC3 | BFC2 | BFC1 | BFC0 | WP | EDS | NCS | V |

BA31–BA8—Base Address Bits 31–8

The base address field (the upper 24 bits of each base address register) selects the starting address for the chip select. The specified base address is a multiple of the selected block size. The corresponding bits of the address mask register (AM31–AM8) define the size of the block for the chip select. The base address field (and the base function code field) is compared to the address on the address bus to determine if a chip select should be generated.

BFC3–BFC0—Base Function Code Bits 3–0

The value programmed into this base function code field causes a chip select to be asserted for a selected address space.

WP—Write Protect

This bit can restrict write accesses to the address range in a base address register. An attempt to write to the ranges of addresses specified in a base address register that has this bit set causes a bus error condition.

EDS—Extended Delay Select

NIS—No CPU Space

V—Valid Bit

This bit indicates that the contents of the base address register and address mask register are valid. The programmed chip selects do not assert until the V-bit is set. A reset clears the V-bit in each base address register, but does not change any other bits in the base address and address mask registers. The address mask register may also be shown in a similar table and described as follows:

PS1–PS0—Port Size Bits 1–0

This field determines whether a given chip select responds with DSACKx and, if so, what port size is returned. The encodings for the PSx bits are:

| PS1 | PS0 | MODE |
|---|---|---|
| 0 | 0 | 32 Bit Port |
| 0 | 1 | 16 Bit Port |
| 1 | 0 | 8 Bit Port |
| 1 | 1 | External PSACKx Response |

The contents of the base address register and address mask registers are determined by start-up software when a processor is booted from an inactive state. Once loaded, the base address register, address mask registers, and the chip select logic operate independent of processor operation in the 68349 processor.

By way of example, the 68349 processor may have a 16-bit, 256 kilobyte memory device interconnected with chip select output 1 and memory located address of $00040000 (hexadecimal). The base address register of chip select 1 may have a contents of $00040013. The address mask register may have contents of $FFF4FBFF.

If the 68349 processor were to issue a read instruction for address $00040400, then the logic of chip select 1 would process the address $00040400 to determine whether or not to activate chip select 1. To this end the chip select logic

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| AM31 | AM30 | AM29 | AM28 | AM27 | AM26 | AM25 | AM24 | AM23 | AM22 | AM21 | AM20 | AM19 | AM18 | AM17 | AM16 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| AM15 | AM14 | AM13 | AM12 | AM11 | AM10 | AM9 | AM8 | FCM3 | FCM2 | FCM1 | FCM0 | DD1 | DD0 | PS1 | PS0 |

AM31–AM8—Address Mask Bits 31–8

The address mask field (the upper 24 bits of each address mask register) defines the chip select block size. The block size is equal to $2^n$, where n=(number of bits set in the address mask field) plus 8.

Any set bit in the address mask register masks a corresponding bit in the address bus (the bit becomes a "don't would logically "AND" each bit of the address with the contents of the address mask register and compare the result with the contents of the base address register. For the example given, the result of the "AND" operation produces a value of $00040000. Since the result matches the contents of the base address register, chip select 1 would be asserted.

Upon activation of chip select 1 the 16 bit, 256 kilobyte memory device responds by retrieving the requested data. The requested data, on the other hand, is not yet in a format suitable for the use by the processor. The data is not yet in a suitable format for internal use by 69349 because data previously generated by the 68349 processor is generated in a 32 bit format and stored in the 16 bit memory device as 2 data segments of 16 bits each in 2 memory location. To restore the data to a 32 bit format the 68349 processor uses two latches with an intervening, bit clearing shift register. During a first clock pulse of the data read cycle, 16 bits of data of a first data segment in bus bit location 15–0 are shifted from the memory device, through the first latch, and shift register to occupy bits 15–0 of the second latch. During subsequent clock cycles the second 16 bit data segment is retrieved from memory also in bus bit locations 15–0 and transferred from the first latch to the shift register were they are shifted to occupy bit location 31–16. The data is then shifted into the second latch which together with the first data segment, still occupying bits 15–0, now makes up a 32 bit data word which may now be operated upon by the 68349 processor.

The prior art has taught that where 16 bit DRAMs or other 16-bit peripheral devices are interconnected with 32-bit computers, the least significant bit (LSB) of the DRAM must be interconnected with the LSB of the 32 bit bus. However, in accordance with the invention it has been determined that where balancing loads are offset from a direct LSB to LSB relation to equalize loading a computer will run faster with less power consumption.

Under the invention a balancing load is offset (see Block 100 of FIG. 5) from the LSB of the computer bus by an offset factor. The offset factor may be any number of bits but a multiple of eight is typically convenient. The following description will be geared towards an example describing the function of single DRAM 13 offset by 16 bits as a balancing load. It should be understood, on the other hand, that the invention may be applied to any number of peripherals offset by any number of bits.

Figure 3:
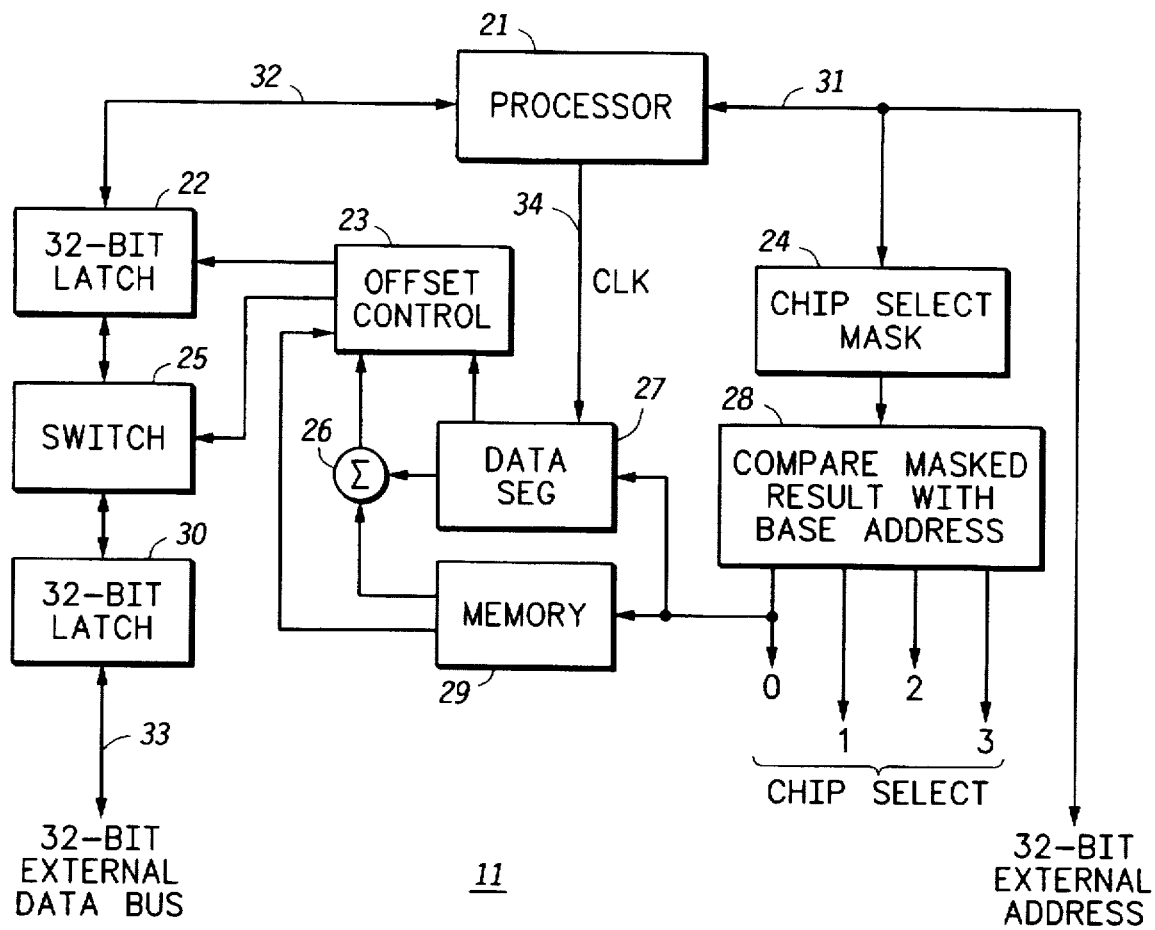
FIG. 3 is a block diagram of a data bus interface in accordance with an embodiment of the invention.

FIG. 3 is a block diagram of a central processing unit (CPU) 11 in accordance with an embodiment of the invention. Included within the CPU 11 are a processor 21, a chip select address mask 24, a comparator 28, and latches 22, 30 constructed in accordance with the prior art. Also included within the CPU 11 is a switch 25 and an offset control 23 constructed to unidirectionally (i.e., from lowest bit to highest bit) and circularly (i.e., bits shifted out of the highest significant bit location are shifted into the lowest significant bit location) shift bits through the switch 25 under the control of a two digit code provided to the offset control 23 from a summer 26. The switch 25 may be, for example, a 32 bit circular shift register, programmable switch, or other shift circuit. In the illustrated embodiment the switch 25 is a circular shift register. The summer 26, in turn, receives information from a data segment indicator 27 and a memory device 29. The data segment indicator 27 and memory 29 are in turn interconnected with chip select 0 output (indicating that the peripheral device used as a balancing load is enabled by ship select 0) of the comparator 28.

A numerical value programmed into memory 29 is indicative of a bus offset distance determined during system boot by the system boot software, and is different for each peripheral used in order to provide for load balancing. If each digit of the numerical value provided to the offset control 23 by the summer 26 causes the data within the circular shift register 25 to shift by 8 bits, then a 16-bit DRAM used as a equalizing load in bit locations 31–16 (i.e., shifting by 16 bits) of the computer bus would cause a value of 2 to be programmed into memory 29.

For example, during a write cycle the processor 21 may transmit an address on the address bus 31 identifying the DRAM 13 as a write destination on the address bus 31. The chip select mask 24 and comparator 28 identify the address as belonging to the DRAM 13 and activate chip select output 0 enabling the DRAM 13. At the same time, the processor also transmits a 32-bit block of information on the data bus 32. Since the DRAM 13 is only a 16-bit device, the 32-bit block of information from the processor bus 32 must be divided into 2 segments and stored in the DRAM 13 at two successive storage locations. The CPU 11 stores the 32-bit block of information within the DRAM 13 by translating (illustrated in FIG. 5, block 102) the 32-bits of information among bus segments of opposing buses (from the processor bus 32 to the external bus 33) of the computer system as two successive 16 bit data segments.

Storage of the 16 bit data segments within the DRAM 13 could occur under either of two possible scenarios in the illustrated embodiment. First, convention calls for storing the low-order bits first, followed by the high order bits. Since the DRAM 13 of FIG. 2 is shown connected to high order lines (31–16) of the external bus 33, the high order bits (31–16) present on processor bus 32 must first be circularly shifted to the low order position within circular shift register 25 before storage of the low order bits (15–0) may proceed via high order bus lines 31–16.

Shifting of the low order bits (15–0) within the circular shift register 25 is accomplished under the control of the offset control 23. The offset control 23, as mentioned, receives a 2-digit control word from summer 26, which, in turn, receives control inputs form memory 29 and data segment control 27. The memory 29, as previously discussed, has been programmed with the value, 2. The data segment control 27 upon being enabled by chip select 0 and receiving the first clock pulse is programmed to put out a 0. The 2 value from memory 29 and 0 from data segment control 27 results in a value of 2 being applied to the offset control 23. A value of 2 applied to the offset control 23 causes the circular shift register to shift by a value of 2×8, or 16 bits. The shift causes low order data bits 15–0 to occupy data positions 31–16 in shift register 25 and data bits 31–16 to occupy positions 16–0.

Following the shift, data bits 15–0 are latched into latch 30 on the opposing side of the bus interface and stored into the first to two sequential data positions of the DRAM 13.

On the next clock pulse from the processor 21, a fresh version of the 32 bit data word stored in latch 22 is transferred from the latch 22 to the circular shift register 25. The next clock pulse, however, causes the data segment control 27 to output a value of 2. The 2 value from the data segment control 27 is added with the 2 value from memory 29 and produces a result of 0 at the output of the summer 26. (Summer 26 is a 2-bit adder which when receiving inputs of 2 and 2 overflows, resulting in an output value of 0.) When a 0 value is applied to offset control 23, the circular shift register 25 passes an unshifted 32-bit packet of information from latch 22 to latch 30. Since data bits 31–16 occupy data lines 31–16, bits 31–16 are now stored as the second data segment in DRAM 13.

Under the second scenario, the higher order bits (31–16) of processor bus 32 are stored first. In such a case the data segment control 27 is programmed to generate a 2 when first enabled by chip select 0 and to generate a 0 on the second clock pulse. The 2 from data segment control 27 on the first clock pulse results in a 0 from summer 26 to the offset control 23. A 0 from the offset control of latch 22 results in no shifting of bits in shift register 25 and in bits 31–16 of latch 22 being transferred to locations 31–16 of latch 30 and, consequently, being stored in the first memory location.

During the second clock pulse the data segment control 27 outputs a 0 resulting in a 2 being input to the offset control 23 and the circular shift register shifting by 16 bits. The shift of 16 bits causes bits 15–0 being latched into locations 31–16 of latch 30 and the low order bits (15–0) being stored in the second memory location.

During a peripheral read operation, under the second scenario, the circular shift register 25 operates substantially the same as during a read operation under the first scenario except for the difference in data segment control 27 and the difference in identity of first and second data segments. The processor 21 issues a read address, as above, the chip select mask 24 and comparator 28 enable an appropriate chip (chip select 0), also as above, and a read occurs substantially as in the first scenario.

While it doesn't matter under the first or second scenario what bus lines 15–0 contain during a write cycle (the DRAM 13 of FIG. 1 is only connected by bus lines 31–16), it does matter what is received within latch 30 from bus lines 15–0 of the external bus 33 during a read cycle and what provisions are made to block bits 15–0 of the external bus 33 during a read cycle. Blocking is necessary to prevent extraneous bits from external bus lines 15–0 from becoming part of the reconstructed block of information formed in the latch 22. Blocking of extraneous bits 15–0, in accordance with an embodiment of the invention, is accomplished by the control of the latch 22 by the offset control 23.

During a read cycle under the first scenario (lower order bits read first), the 32 bits of the external bus 33 are transferred into the circular shift register 25. The offset control 23 instructs the circular shift register 25 to shift 16 bits (bits 31–16 are shifted into shift register location 15–0) based on a 2 value received from the memory 29 and a 0 received from the data segment control 27. The offset control next activates bits 15–0 of latch 22 to store the first information segment since under the first scenario the first segment always occupies bits 15–0. Alternatively, the offset value stored in memory 29 and the segment number from data segment control 27 could be used to dynamically determine which bits of latch 22 are to be activated for storage of the first segment.

During the second half of the read cycle the second information segment (high order bits) are latched into the latch 30. The high order bits are transferred into the circular shift register 25. As above, a 2 value from memory 29 and a 2 value from the data segment controller 27 are summed within the summer 26 causing overflow and a zero shift command from the offset control 23 to the circular shift register 25. The offset control 23 activates bits 31–16 of the latch 22 and stores the second information segment.

The latching of the first information segment into bits 15–0 of the latch 22 and of the second information segment into bits 31–16 of the latch 22 completes the reconstruction of an information block. The processor 21 then reads the 32 bit information block on the processor bus 32 and the process continues.

In another embodiment, the invention is applied to balance loads on the address bus. As with the data bus, the prior art has taught that the LSB of a processor address bus must be connected to the LSB of a peripheral address bus. Under the invention, peripheral devices having smaller address buses than a controlling processor are used as balancing loads for the address bus of the controlling processor by offsetting the address bus of the peripheral device from the LSB of the processor 21 by a displacement factor.

The application of the invention to the address bus is simplified by the availability of chip select outputs (0–3). The use of the chip select outputs allow much smaller address length (i.e., 8 bits) than the total available on the processor address bus (i.e., 32 bits) to uniquely specify a memory location. For application of the invention to the address bus a circular shift register simply shifts the LSB of the processor address to the location of the LSB of the peripheral device on the external address bus.

For application of the invention to the address bus, reference shall again be made to FIGS. 1 and 2. FIGS. 1 and 2 in this regard may be used to refer to a 32 bit address bus with a ROM interconnected with bits 31–0, a PCMCIA module interconnected bus lines 15–0, and a balancing load (DRAM 13) interconnected with bus lines 31–16.

Figure 4:
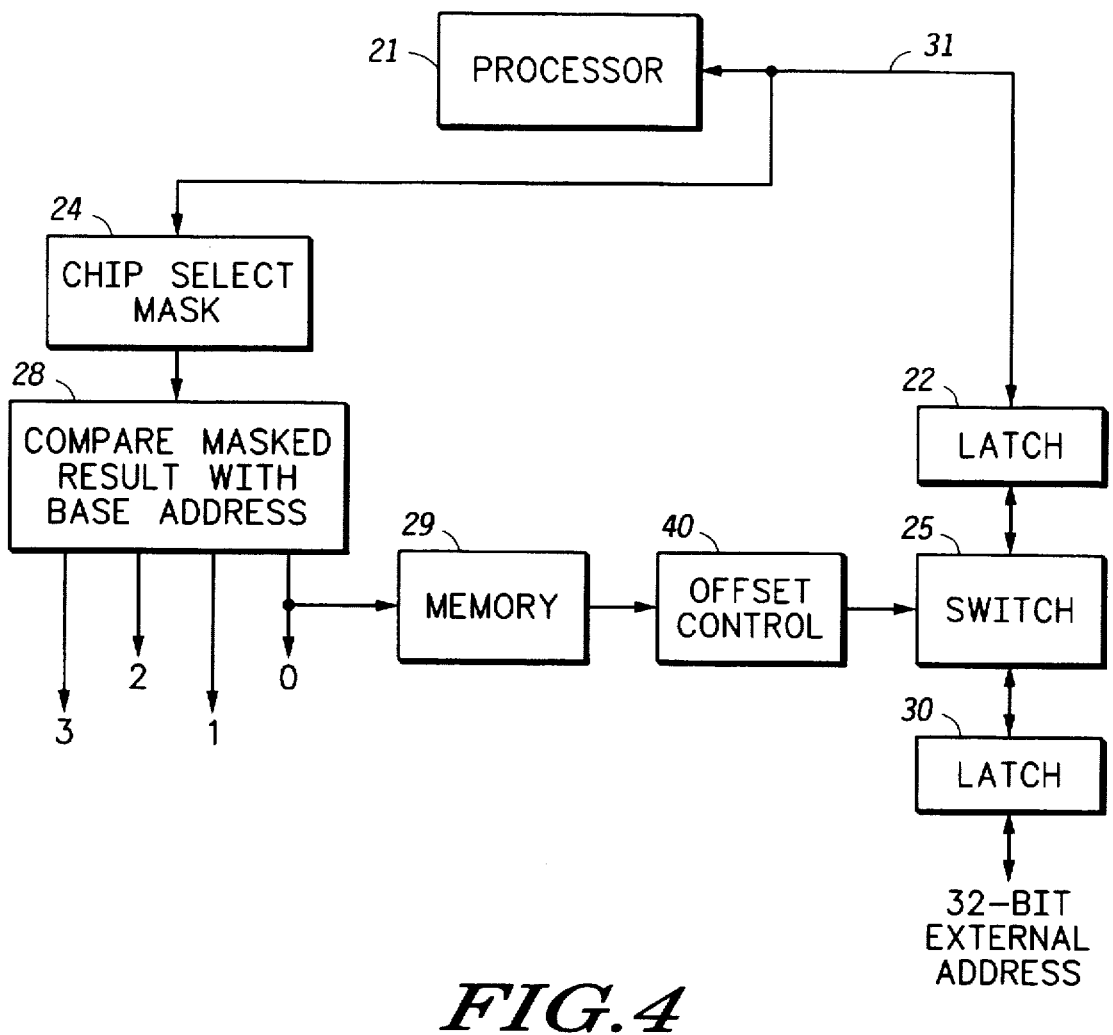
FIG. 4 is a block diagram of an address bus interface in accordance with an embodiment of the invention.

FIG. 4 may be used to provide an illustration of the application of the invention to the peripheral device (DRAM 13) used as a balancing load at address bus line location 31–16.

As with previous examples, memory device 29 of FIG. 4 is programmed with the bus location of the DRAM 13. When the processor 21 chooses to access the DRAM 13, the processor issues a 32-bit address of the DRAM 13 on the address bus 31. The chip mask 24 and comparator 28 enable DRAM 13 through chip select output 0. Activation of chip select 0 causes (through operation of memory device 29 and offset control 40) the 16 least significant bits of the processor address bus 31 to be shifted to external bus location 31–16. Since DRAM 13 is interconnected with bus lines 31–16, the shifting of the address bits to these lines causes DRAM 13 to respond as if addressed under the prior art (DRAM 13 interconnected with bus lines 15–0).

Figure 5:
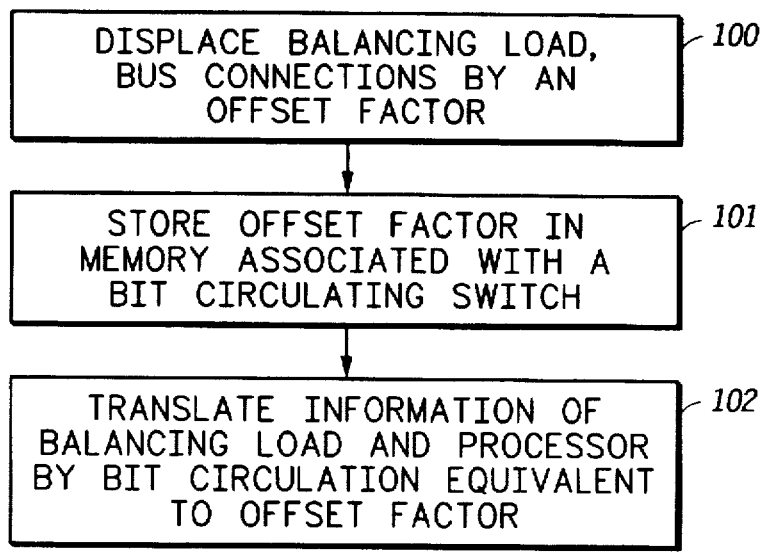
FIG. 5 is a flow chart depicting an example of translation of information among bus segments in accordance with the invention.

FIG. 5 is a flow chart illustrating load balancing in accordance with an embodiment of the invention. As shown bus connections of a balancing load are displaced 100 by an offset factor. An offset factor is stored 101 in a memory location associated with the switch 25. Information is then translated 102 among opposing buses by a factor equivalent to the offset factor.

While specific embodiments of the present invention have been shown and described herein, further modifications and improvements may be made by those skilled in the art. All such modifications which retain the basic underlying principles disclosed and claimed herein are within the scope of the invention.

I claims:

1. A method of balancing loads on a digital device bus system, such method comprising the steps of:

displacing a first load bus connection from a least significant bit location of the digital device bus system by a first offset factor from a first predetermined bit location to a second predetermined bit location;

displacing a second load bus connection from a least significant bit location of the digital device bus system by a second offset factor from the first predetermined bit location to a third predetermined bit location; and translating information between the first and the second load bus connection and a processor bus of the digital device bus system within a switch by shifting the information by a number of bits equivalent to the first offset factor and to the second offset factor.

2. The method as in claim 1 wherein the step of displacing comprises the step of displacing a bus connection of at least one load from a first predetermined bit location of an address portion of the digital device bus by an offset factor to a second predetermined bit location.

3. The method as in claim 1 wherein the step of displacing comprises the step of displacing a bus connection of at least one load from a first predetermined bit location of an data portion of the digital device bus by an offset factor to a second predetermined bit location.

* * * * *